United States Patent
Gu et al.

(10) Patent No.: US 6,188,958 B1
(45) Date of Patent: Feb. 13, 2001

(54) SATELLITE NAVIGATION

(75) Inventors: Xiaogang Gu, Erbach; Ansgar Leiprecht, Ulm, both of (DE)

(73) Assignee: Honeywell International Inc., Morristown, NJ (US)

( * ) Notice: Under 35 U.S.C. 154(b), the term of this patent shall be extended for 0 days.

(21) Appl. No.: 09/463,281

(22) PCT Filed: Jul. 8, 1998

(86) PCT No.: PCT/EP98/04231

§ 371 Date: Jan. 24, 2000

§ 102(e) Date: Jan. 24, 2000

(87) PCT Pub. No.: WO99/04281

PCT Pub. Date: Jan. 28, 1999

(30) Foreign Application Priority Data

Jul. 19, 1997 (DE) .............................................. 197 31 109

(51) Int. Cl.⁷ .................................................... H04B 7/185
(52) U.S. Cl. .......................... 701/215; 701/207; 701/213; 701/214; 340/988; 342/357.03; 342/357.05; 342/357.06

(58) Field of Search ..................................... 701/200, 207, 701/213, 214, 215; 342/357.01, 357.03, 357.05, 357.06; 340/988, 990, 995

(56) References Cited

U.S. PATENT DOCUMENTS

| 4,891,655 | * | 1/1990 | Joguet et al. | 340/988 |
|---|---|---|---|---|
| 5,311,194 | * | 5/1994 | Brown | 342/357.06 |
| 5,471,217 | * | 11/1995 | Hatch et al. | 342/357.03 |

* cited by examiner

*Primary Examiner*—William A. Cuchlinski, Jr.
*Assistant Examiner*—Yonel Beaulieu

(57) ABSTRACT

A method for satellite navigation and, in particular, a method for DGNSS (Differential Global Navigation Satellite System) is provided. Separate differential corrections are generated in a reference station with at least one fixed-position GNSS receiving antenna, for code and phase measurement. If necessary, a combination of the differential corrections is also produced. The differential corrections are transmitted to an aircraft (with GNSS) which is approaching landing, for example, via a data radio transmission link. This then enables high-precision GNSS navigation, to the extent that landings can even be executed fully automatically.

11 Claims, No Drawings

SATELLITE NAVIGATION

TECHNICAL FIELD OF THE INVENTION

The invention departs from a satellite navigation method according to the preamble of claim 1.

The invention in particular is used in navigation in connection with GPS-satellites (Global Positioning System). For the navigation within a three-dimensional space a (satellite)-receiver, the geographic position of which shall be evaluated, always requires four different satellite communications (SV) at the same time. In navigation the ranges between the receiving antenna (receiver antenna) of the receiver to three different satellites, the positions of which are known and which can be received at this time are measured. The simultaneous reception of the signals of a fourth satellite is required for time synchronisation of the receiver to the system time of the satellites. Herewith the position of the receiving antenna within the three-dimensional space is determined.

BACKGROUND OF THE INVENTION

Since GPS-satellites transmit coded signals, range-measuring by a receiver may be implemented in different ways, namely:

By evaluating the received code signals (code measuring) or

By evaluating the carrier phases (carrier phase measuring).

Correlated errors may occur in these measurements between the receivers, which e.g. are due to satellite clock errors and changes in the troposphere and the ionosphere. Those errors are determined as corrections (correction values) for the mobile station. In a differential mode (DGPS) of GPS a range correction can be evaluated in a reference station from a comparison between a pseudo range for the reference station (range evaluated by satellite navigation between the reference station and a receiveable satellite) and a known geometrical range between the reference station and the received satellite. The pseudo range measurements of the mobile station are corrected by means of range corrections which are transmitted by the reference station by means of (data)-radio relay. Non-correlated errors may also appear between receivers, e.g. due to effects of multi-path propagation of the signals between the receivers. Those errors should be suppressed as much as possible since they cannot be reduced by the differential correction. For reducing the effects of non-correlated errors the measured value of the carrier phase is used, the measurement noise and multi-path propagation of which is within the mm and cm wavelength range. However, an ambiguity of the number of wavelengths from carrier phase measurement in a detrimental manner results since the measuring of the carrier phase in a phase-locked loop (PLL)-measuring device does not change in a displacement by a random integer number of the phase cycles. A known technique, the so-called "carrier-smoothed code" combines the code-values with the carrier phase values and suppresses herewith measurement noise and effects of multi-path propagation during code measurement. Herewith by means of the code phase measurement the Doppler shift or the range change from the satellite to the receiver, respectively, between two points of time is determined, and the phase ambiguities by means of a code measurement with the smoothed phase are approximately evaluated. The time constant of the filter of the present technique with the carrier-smoothed code is limited by the ionosphere error since this error has a counter-current behavior during code and phase measurement. In the differential operational mode with the carrier-smoothed code a large filter time constant may reduce the non-correlated errors between the reference and the mobile station. However, a large filter constant in a disadvantageous manner also distorts the ionospheric error in the differential correction which per se is correctable so that the ionospheric error may not completely be corrected at the mobile station. With such a method, which is known as the DGPS-navigation method, a determination of the position of the receiver with an accuracy of approximately ±2 m to ±3 m (95%) may be attained. This accuracy in the case of some applications, e.g. in approach of landing of a commercial aircraft, is not sufficient, in particular in the case where this approach of landing is to be made under socalled CATIIIb conditions, i.e. at a visual range of zero.

SUMMARY OF THE INVENTION

It is the object of the invention to devise a method according to this species, with which a reliable and accurate navigation is possible, in particular during the approach of landing of an aircraft.

This object is achieved according to the features as indicated within the characterizing portion of claim 1. Advantageous embodiments and/or developments may be taken from the further claims.

The first advantage of the invention consists in that an accurate and quick determination of the position becomes possible so that in particular a complete landing of a commercial aircraft may be performed completely automatic. During the approach of landing, it is possible in a reliable manner to accurately determine the position and velocity also under possible influences of long-wave multi-path propagations so that higher accuracies than under the mentioned CAT IIIb-conditions are attainable.

A second advantage consists in that the method for the reference station is nearly independent from the type of the (mobile) receiver and the included evaluation of the received GPS-satellite signals.

Further advantages result from the following description.

BRIEF DESCRIPTION OF THE DRAWINGS

Not Applicable

DETAILED DESCRIPTION OF THE INVENTION

The invention in the following will be explained with respect to embodiments which are based on the GPS-satellite navigation.

The invention departs from the knowledge that the standards at this time, e.g. according to RCTM-104, RCTA-DO-217(SCATI), for differential corrections in the GPS-navigation provide that for the range (or measured value related to it as for instance pseudo range, Doppler, delta range, range rate) measured between a (mobile) receiving antenna (with receiver connected to it) and a predetermined GPS-satellite, the differential corrections are evaluated by means of a fixed reference station (at a known location). As far as within the reference station, as well as within at least one (mobile) receiver of a navigating object, (e.g. aircraft) a plurality of measured values are evaluated simultaneously, the named standards which transmit the correction values, e.g. according to the data link type 1 of RTCA-DO-217/RTCM-104 to the (mobile) receiver, use different methods. The type 1 either allows a so-called code differential correction or for increasing the accuracy a single differential correction value for the so-called "carrier phase smoothed range".

With the invention the non-filtered pseudo ranges between the reference station and the satellites to be received which are evaluated from a code measuring of the reference station are compared to the related geometrical ranges evaluated by means of the trajectory parameters. From there the code range differential corrections are calculated, e.g. periodically in predetermined time intervals (time steps). Therefore, advantageously no filter with a possible too small or too large time constant is used. Timely in parallel to this the range variations (integrated Doppler shifts) evaluated from the carrier phase measurement at the reference station are compared to geometrical range variations evaluated by means of trajectory parameters, and from there the carrier phase range differential corrections at the same time steps of the code range differential corrections are evaluated. Both differential corrections either are directly transmitted from the reference station to the mobile station, e.g. by means of a data radio link as common in the air traffic at this time. Alternatively it is possible to directly transmit the measured raw data evaluated by the reference station, e.g. code pseudo ranges as well as carrier phases to the mobile station and then to calculate from there the differential corrections on board the mobile station.

The non-filtered code pseudo ranges and the integrated Doppler shifts evaluated from the carrier phases are separately corrected with the according differential corrections of the reference station. The combination of code and carrier phase measurements, the so-called "carrier smoothed code" is made only after the application of the differential corrections. By means of this separate differential correction the ionosphere error (at the so-called local area DGPS) to a large extent is eliminated by the separately corrected values for the code and carrier phase of the mobile station.

It may be recognized that by the described method for a separate differential correction an optimum error compensation is made possible in an advantageous manner.

In the remaining (non-common mode) errors their time-variable component advantageously may be suppressed by a low pass filtering with a large time constant which may be empirically evaluated so that also slowly changing errors, e.g. multi-path errors besides a neglectable value, are reduced without distorting possible ionospheric errors (so-called common mode errors) at the differential correction in such a way that they cannot be compensated.

The differential corrections evaluated by this method preferably are transmitted by means of a data radio link to a navigating object, e.g. an aircraft in an approach for landing. There each of the measured values is individually and differentially compensated (corrected). Herewith three cases exist:

1. Within the navigating object only the code range (range from the GPS code signals) is measured and is compensated (corrected) according to the related non-filtered code differential correction transmitted by the reference station.
2. Within the navigating object only the phase carrier range (range from the carrier phase measurement of the GPS-signals) is measured and is compensated (corrected) according to the related phase differential correction transmitted by the reference station.
3. Within the navigating object code- and carrier phase range is measured and is compensated (corrected) according to the transmitted and related code- as well as phase differential corrections.

From the individual measured values compensated in this way subsequently within the mobile station a phase-smoothed code range for each satellite to be received is formed. Herewith preferably a low pass filter with a large low pass time constant is implemented in order to reduce—as described—the error effect produced by slowly changing errors (multi-path propagation) to a neglectable value.

The invention is not limited to the described embodiments, but obviously is applicable to further embodiments. For instance a highly precise GPS-satellite navigation for vessels is possible, e.g. for docking maneuvers.

What is claimed is:

1. Satellite navigation method, for a navigating object, the position of which is determined from a received signal of a plurality of satellites (satellite navigation),the method comprising the steps of:

evaluating at a reference station, which comprises a known antenna position, a differential correction data;

calculating a differential correction for individual satellites from a comparison of a measured range value with a geometric range value calculated from the known antenna position, wherein the differential corrections are calculated at one of the navigating object by transmiting the differential correction data to the navigating object or, at the reference station from transmitted raw measured values within the navigating object;

correcting the measured range value in the navigating object by the differential correction such that, for the reference station, related range values are evaluated from code-and carrier phase measurements, the differential corrections of a non-filtered code psuedo range and the differential corrections of an integrated phase Doppler shift are evaluated individually from a comparison of the measured range values with the geometrical range values calculated from the known position, for the navigating object the non-filtered code psuedo ranges and the integrated Doppler shifts evaluated from the carrier phases are corrected individually with related code-and phase differential corrections, and after this correction the individual differential corrected measured values of the navigating object are combined to "carrier-smoothed codes".

2. Satellite navigation according to claim 1, characterized in that for the satellite navigation within the navigating object as well as within the reference station the satellite signals of GPS-satellites are evaluated.

3. Satellite navigation according to one of the preceding claims for use in determining the position of an aircraft as navigating object.

4. Satellite navigation according to claim 1 for use as a landing support to an aircraft.

5. Satellite navigation according to claim 2 for use as a landing support to an aircraft.

6. Satellite navigation according to claim 3 for use as a landing support to an aircraft.

7. A method for determining the position of a mobile receiving antenna within a three-dimensional space, the method comprising the steps of:

providing a fixed reference station at a known location;

providing a GPS satellite;

evaluating a non-filtered pseudo range value from a code phase measurement of the reference station;

evaluating a geometrical range value from a trajectory parameter;

comparing the non-filtered pseudo range value between the reference station and the satellite with the geometrical range value;

calculating a code pseudo range differential correction as a result of at least one of the previous evaluating or comparing steps;

evaluating an integrated Doppler shift from a carrier phase measurement;

evaluating a geometrical range variation from the trajectory parameter;

comparing the integrated Doppler shift with the geometrical range variation;

calculating a carrier phase range differential correction;

correcting the non-filtered code pseudo range and the integrated Doppler shift according to the corresponding calculated differential corrections; and combining the code and carrier phase measurements to "carrier smoothed codes" after the correcting step.

8. The method of claim 7 wherein the mobile receiving antenna comprises an aircraft receiving antenna.

9. The method of claim 7 wherein all the evaluating steps are performed in parallel.

10. The method of claim 7 further comprising the step of transmitting the differential corrections from the reference station to the mobile receiving antenna.

11. The method of claim 7 wherein the calculating steps are performed in the mobile receiving antenna.

* * * * *